United States Patent
Scheim et al.

(10) Patent No.: US 9,894,613 B2
(45) Date of Patent: Feb. 13, 2018

(54) TIME OF FLIGHT BASED PASSIVE ENTRY/PASSIVE START SYSTEM

(71) Applicant: GM GLOBAL TECHNOLOGY OPERATIONS LLC, Detroit, MI (US)

(72) Inventors: Kobi J. Scheim, Pardess Hanna (IL); Moshe Laifenfeld, Haifa (IL); Nadav Lavi, Ramat-Hasharon (IL)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/163,893

(22) Filed: May 25, 2016

(65) Prior Publication Data
US 2017/0026910 A1    Jan. 26, 2017

Related U.S. Application Data
(60) Provisional application No. 62/195,421, filed on Jul. 22, 2015.

(51) Int. Cl.
| | |
|---|---|
| *G08B 1/08* | (2006.01) |
| *H04W 52/02* | (2009.01) |
| *B60R 25/24* | (2013.01) |
| *G07C 9/00* | (2006.01) |

(52) U.S. Cl.
CPC ......... *H04W 52/0245* (2013.01); *B60R 25/24* (2013.01); *G07C 9/00309* (2013.01); *B60R 2325/103* (2013.01); *G07C 2209/08* (2013.01); *G07C 2209/63* (2013.01); *Y02B 60/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,725,138 B2* | 4/2004 | DeLuca | ................. | G01C 21/26 340/426.17 |
| 7,061,397 B2* | 6/2006 | Haselsteiner | ........... | B60R 25/24 340/426.15 |
| 7,602,274 B2* | 10/2009 | Lee | ..................... | G06K 19/0723 340/10.2 |
| 7,629,919 B2* | 12/2009 | Wilcox | ................. | G01S 13/767 342/118 |
| 9,613,475 B2* | 4/2017 | Zivkovic | ............ | G07C 9/00007 |
| 2005/0237160 A1* | 10/2005 | Nolan | ................ | G06K 19/0705 340/10.33 |
| 2006/0044181 A1* | 3/2006 | Wilcox | ................. | G01S 13/825 342/118 |
| 2007/0024416 A1* | 2/2007 | Tang | ..................... | B60R 25/245 340/5.61 |
| 2008/0284564 A1* | 11/2008 | Leitch | ..................... | B60R 25/24 340/5.61 |
| 2010/0201483 A1* | 8/2010 | Nakajima | ............. | B60R 25/245 340/5.61 |

* cited by examiner

*Primary Examiner* — Travis Hunnings
(74) *Attorney, Agent, or Firm* — Quinn IP Law

(57) ABSTRACT

A passive entry-passive start portable device detection system. A portable device includes a transceiver. At least one vehicle-based transceiver broadcasts an interrogation signal. The transceiver of the portable device transmits a response signal in response to the interrogation signal. A controller determining at least a range of the portable device as a function of the time-of-flight of the interrogation and response signals. The controller controls a measurement duty cycle of the interrogation signal as a function of the determined range.

21 Claims, 3 Drawing Sheets

TIME OF FLIGHT BASED PASSIVE ENTRY/PASSIVE START SYSTEM

CROSS-REFERENCE TO RELATED APPLICATIONS

This application claims priority of U.S. Provisional Application Ser. No. 62/195,421 filed Jul. 22, 2015, the disclosure of which is incorporated by reference.

BACKGROUND OF INVENTION

An embodiment relates to time of flight estimation.

Passive entry/passive start systems allow a user to passively enable entry to a vehicle or enable vehicle operations without having to directly utilize a key or manually actuate a fob for entering/starting a vehicle. Such passive systems operate by monitoring a proximity of a use carrying a passive device, such as a passive fob, on oneself, and when a trigger occurs such as touching of a door handle, the system will transmit an interrogation signal from which the fob transmits a reply signal. If the they vehicle and the fob carried by the user are successfully paired, then the doors will unlock without the user having to press an unlock key.

Some passive systems operate based on a wakeup trigger, such that the vehicle system wakes up when an action occurs such as touching the door handle. Others systems could continuously transmit an interrogation signal and monitor for a fob in the proximity without a wake up action; however, a continuous transmission of an interrogation signal could cause battery drain or other issues. That is, if the interrogation signal is transmitted at a low rate (long intermission period between interrogation signal transmissions such as 10 second), then a user's action of attempting to open the door may not be detected if the user approaches in between the transmitted interrogation signals which would be a nuisance if door remains locked while the user attempts to open the door. This could also cause warranty issues as the user may conclude that the system is not operating properly. Alternatively, if the system sends out interrogations signals at a high rate (small intermission period between interrogation signal transmissions such as 1 millisecond), then battery drain could occur due to excessive energy consumption.

SUMMARY OF INVENTION

An advantage of an embodiment is dynamic adjustment of the duty cycle of an interrogation signal that reduces energy consumption. The system utilizes a plurality of predetermined transmission ranges relative to the vehicle, and based on what range the portable device is in determines the duty cycle of the interrogation signal. The system will initially transmit interrogation signals at a low measurement duty cycle (increased delays between transmitted signals) for detecting a remote device at a far distance from the vehicle. As the portable device is detected at closer ranges to the vehicle, the measurement duty cycle transmission is increased (smaller delays between transmitted signals). As a result, the system dynamically adjusts the duty cycle of the interrogation signal to conserve energy such that minimal power is utilized when the portable device is distal from the vehicle. As the portable device moves closer to the vehicle, the measurement duty cycle of the transmission is increased to maintain awareness of the approaching portable device. As a result, increased power consumption is only utilized when necessary, such as when the portable device gets closer to the vehicle where the location of the portable device must be constantly checked to determine if a vehicle operation should be actuated. The further the distance between the portable device and the vehicle, the less frequent the monitoring as it will take time for the portable device to approach the vehicle. Various techniques may be used to determine a location of the portable device such as Time-of-Flight or RSSI. In addition, an Angle-of-Arrival may also be to determine not only a position of the portable device but a direction of the approaching portable device.

In addition, a rate-of-approach may further be determined and used to modify the duty cycle of the interrogation signal. That is, as opposed to just monitoring to wait to see when the portable device is within a respective range, the system can anticipate the range that the portable device will be in based on the rate-of-approach of the portable device.

An embodiment contemplates a passive entry-passive start portable device detection system that comprises a portable device including a transceiver. At least one vehicle-based transceiver broadcasts an interrogation signal. The transceiver of the portable device transmits a response signal in response to the interrogation signal. A controller determines at least a range of the portable device as a function of the time-of-flight of the interrogation and response signals. The controller controls a measurement duty cycle of the interrogation signal as a function of the determined range.

An embodiment contemplates a method of enabling passive entry-passive start operations of a vehicle. An interrogation signal is transmitted by at least one vehicle-based transceiver. A response signal is transmitted by the at least one vehicle-based transceiver in response to the interrogation signal. At least a range of the portable device is determined by the controller as a function of the time-of-flight of the interrogation and response signals. Vehicle operations of the vehicle are passively enabled as a function of the determined range of the portable device to the vehicle.

DETAILED DESCRIPTION

Figure 1:
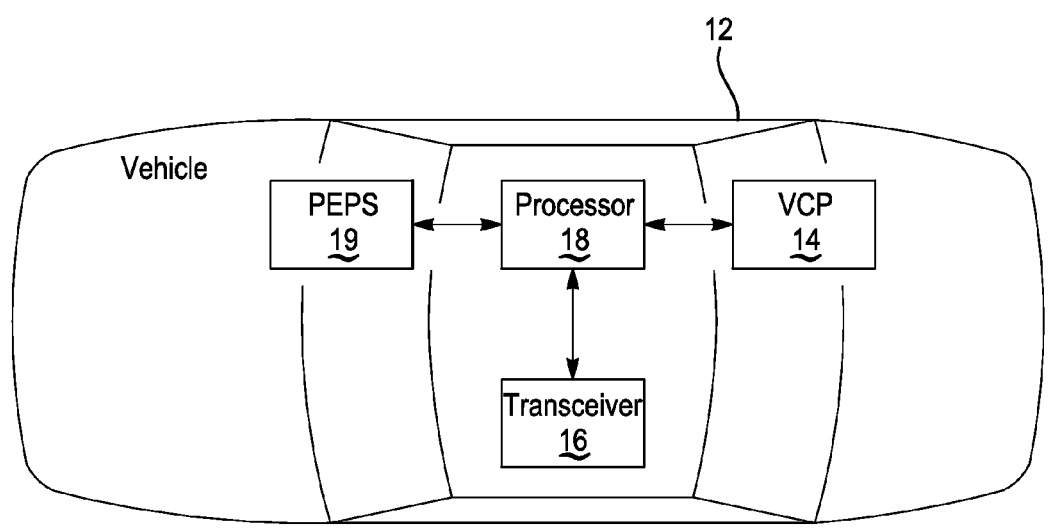
FIG. 1 is a block diagram of time-of-flight estimation system.
Figure 1:
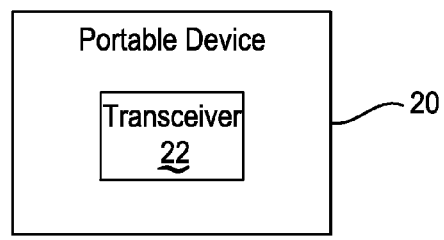

The following detailed description is meant to be illustrative in understanding the subject matter of the embodiments and is not intended to limit the embodiments of the subject matter or the application and the uses of such embodiments. Any use of the word "exemplary" is intended to be interpreted as "serving as an example, instance, or illustration." Implementations set forth herein are exemplary and are not meant to be construed as preferred or advantageous over other implementations. The descriptions herein are not meant to be bound by any expressed or implied theory presented in the preceding background, detailed description or descriptions, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, (e.g., memory elements, digital signal processing elements, logic elements, look-up tables, or the like, which may carry out a variety of functions under the control of one or more microprocessors or other control devices).

When implemented in software, various elements of the systems described herein are essentially the code segments or computer-executable instructions that perform the various tasks. In certain embodiments, the program or code segments are stored in a tangible processor-readable medium, which may include any medium that can store or transfer information. Examples of a non-transitory and processor-readable medium include an electronic circuit, a microcontroller, an application-specific integrated circuit (ASIC), a semiconductor memory device, a ROM, a flash memory, an erasable ROM (EROM), a floppy diskette, a CD-ROM, an optical disk, a hard disk, or the like.

The system and methodology described herein can be utilized to identify a portable device relative to a vehicle. While the approach and methodology are described below with respect to vehicle applications, one of ordinary skill in the art appreciates that an automotive application is merely exemplary, and that the concepts disclosed herein may also be applied to any other suitable systems and boundary detections The term "vehicle" as described herein can be construed broadly to include not only a passenger automobile, but any other vehicle including, but not limited to, rail systems, planes, off-road sport vehicles, robotic vehicles, motorcycles, trucks, sports utility vehicles (SUVs), recreational vehicles (RVs), marine vessels, aircraft, farming vehicles, self-driving vehicles, shared vehicles, and construction vehicles.

FIG. 1 illustrates a block diagram of time-of-flight estimation system for the embodiments described herein. The system as described may be used for a passive entry and/or passive start system for a vehicle; however, it should be understood that system and method as described herein may be used for other type of systems aside from vehicles where entry is required into or out of an interior space that utilizes passive operations. FIG. 1 shows a block diagram that includes a structure having an interior compartment such as a vehicle 12. The vehicle 12 is equipped with a Vehicles communication platform (VCP) 14 that includes at least one transceiver 16 (or separate transmitter and receiver) for broadcasting signals exterior of the vehicle 12. The at least one transceiver 16 typically has a range of 30-100 feet indoor and approximately 300 feet outdoors. In a general case, the VCP may have external antennas or internal antennas as well as any hybrid combination of the two options.

The VCP 14 further includes a processor 18 for determining range information from returned broadcast signals, as well as angle of arrival, or position (which will be discussed in detail later).

The vehicle may further include a passive entry/passive start system (PEPS) 19 that enables vehicle operations passively (i.e. access the vehicle or start the ignition without actively inserting the key into the keyhole). PEPS may include passive entry into the interior passenger compartment of the vehicle, passive entry into a trunk or liftgate of a vehicle, or passively starting the engine.

A portable device 20 carried by the user includes, but is not limited to, a key fob, dongle, or cell phone. The portable device 20 further includes a transceiver 22 used to receive interrogation signals broadcast by the vehicle 12 and transmit a response signal to the vehicle.

In a first embodiment, the VCP 14 utilizes the time-of-flight of the transmitted signal to determine only the range of the portable device 20 relative to the vehicle. That is, only a range distance is calculated at different time intervals for determining when the portable device 20 is within a predetermined proximity to the vehicle where passive entry/passive start operations should be actuated. The VCP 14 broadcasts a respective signal at timed intervals for determining when the portable device 20 is within a respective distance. Based on the time-of-flight as determined as a function of the broadcast signal and the response signal, a range distance of the portable device 20 relative to the vehicle 12 is determined. The VCP 14 transmits signals at periodic intervals for determining whether the portable device 20 is within a respective distance of the vehicle for actuating passive entry functionality of the vehicle.

Figure 2:
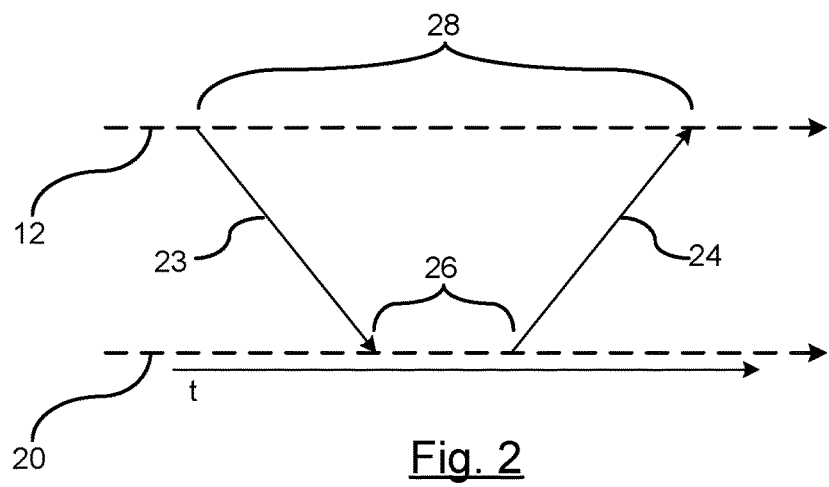
FIG. 2 is a timing diagram between a master transceiver device and a slave transceiver device.

Time-of-flight (TOF) describes a time that a broadcast signal takes to reach a detector while traveling over a certain distance. The broadcast signal is broadcast for the purposes of being a two way signal. ToF measurements are currently obtained using WiFi (IEEE 802.11) and UWB (IEEE 802.15.4). In addition, potentially LTE device-to-device communication (under 3GPP standard body) may be utilized. In addition, non-standard ToF ranging systems can also be utilize for PEPS systems. FIG. 2 illustrates a timing diagram between a master transceiver device and a slave transceiver device. For illustrative purposes, in FIG. 2, the master transceiver is in the vehicle 12 and the slave transceiver is in the portable device 20. When the master transceiver broadcasts a first signal 23, the broadcast signal is received by the slave transceiver. In response to receiving the broadcast signal from the master transceiver, the slave transceiver transmits a response signal 24 that is received by the master transceiver. The interval between when the broadcast signal is received by the slave transceiver to the time when the slave transmits a response signal is referred to as an access delay 26 (i.e., the access delay occurs when the slave transceiver receives the broadcast signal and prepares to transmit the response signal). A total transaction time 28 is based on the time when the signal is transmitted by the master transceiver to when the response signal is received by the master transceiver. For the purposes described herein, only the time that signals are actively being transmitted (i.e. traveling over the air) are used to determine the time-in-flight. Therefore, the access delay must be factored out of the total transaction time. To factor out the access delay, the access delay as determined by the slave transceiver is embedded in the response signal. The master transceiver identifies the access delay from the response signal and compensates for the access delay to determine a round trip time which excludes the access delay. In other cases, the access delay is determined prior to the ToF measurement cycle, e.g. during a setup cycle where messages transaction between the master and slave defines the access delay or by defining it in a standard specification. In all those cases the master transceiver is able to factor out the access delay resulting in a round trip Time-of-Flight measurements.

As a result, based on the round trip times as determined during each periodic transmission by the master transceiver, a range can be determined relative to the portable device for determining when the portable device is within a predetermined distance for enabling passive entry operations.

Figure 3:
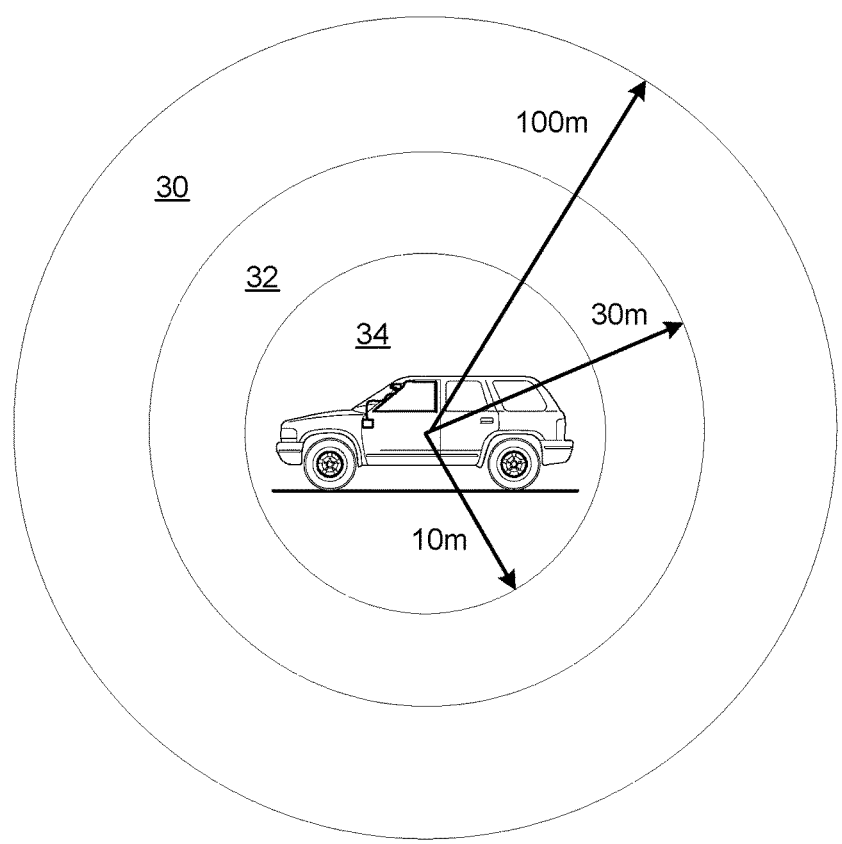
FIG. 3 a power awareness saving mode based on regions.

An issue with transmitting the broadcast signals from the master transceiver occurs when a same duty cycle is continuously used. If the duty cycle is too large, then the approaching portable device may not be interrogated in a timely manner for accessing the vehicle. If the duty cycle is too small, the approaching portable device may be timely identified, however, the system may consume too much power due small duty cycle. To minimize power consumption, transmission-reception duty cycle periods are controlled for saving power. FIG. 3 illustrates a power awareness saving mode that operates based on the region that the portable device is identified in. As illustrated in FIG. 3, three regions are defined about the vehicle 12. It should be understood that more or less range regions may be utilized without deviating from the scope of the invention. As shown in FIG. 3, a first range region 30 is defined as greater than 30 meters from the vehicle (up to a maximum of 100 m). A second region 32 is defined between 10 m<R<30 m. A third region 34 is defined as less than 10 meters from the vehicle. Based on what region the portable device is detected dictates the range reporting time interval that broadcast signals are broadcast. For example, if a determination is made that the portable device responds when the vehicle within the first region 30 (i.e., >30 meter), then a broadcast signal is broadcast once every 10 sec to conserve on power consumption. The rationale is that if the portable device is detected between 30-100 meters, then the VCP can generally monitor for the portable device as a person approaching the vehicle outside of 30 meters would not arrive at the vehicle within 10 seconds. As a result, larger ranges with larger duty cycling can be utilized during this region for reducing power consumption. In an alternative embodiment, the duty cycle can be a different function of the range (e.g. monotonically smooth function).

When the portable device is detected in the second region 32 (10 m<R<30 m), then the range reporting time interval can be switched to once per second. Under this condition, the duty cycle of interrogating the portable device is increased to readily track the portable device as the portable device gets closer to the vehicle. A lower range relative to the first region 30 increases the measurement duty cycle (smaller duty cycle) as well as potentially transitioning from less accurate techniques to the higher accuracy techniques. The range reporting time interval is selected to accommodate a person carrying the portable device at a respective pace (e.g., walking) and being able to readily monitor the proximity of the portable device relative to the vehicle while still not consuming maximum power draw. When the portable device is detected in the third region 34 (i.e., R<10 m), then the range reporting time interval is switched to once per 100 msec. This allows the system to track the user at extremely smaller time intervals for identifying when to actuate the passive entry system. In addition to the above mentioned process, the range rate (i.e. speed of approach) can also be derived and incorporated into the duty cycle calculation and hybrid approach of ranging method selection.

For the range-only determination in FIG. 2, the vehicle is only mounted with one transceiver. At each measurement cycle, the key-fob range is derived. The VCP determines and maintains all range and position information. This information is fused and provided to the PEPS module where the PEPS module actuates the passive entry operations. Based on the identification of the portable device, operational behavior (e.g., use behavior may be utilized to unlock respective doors based on the vehicle usage associated with the portable device identification).

Figure 4:
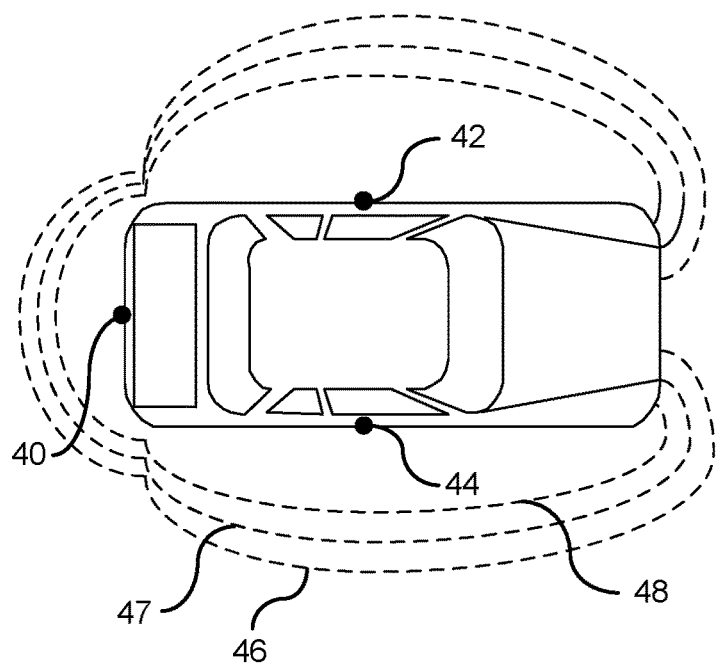
FIG. 4 illustrates a sensing system for sensing whether the portable device is inside vehicle.
Figure 5:
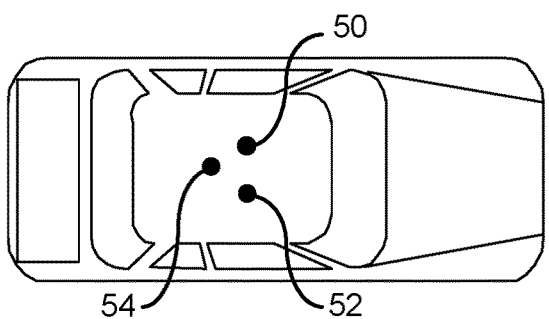
FIG. 5 is an illustration of a vehicle system utilizing three transceivers.

FIG. 4 illustrates hybrid sensing system for sensing whether the portable device is inside the vehicle or outside the vehicle. As illustrated in FIG. 5, low frequency antennas are positioned on respective sides of the vehicle, for example, a driver's side 42, a passenger's side 44, and a trunk side 40. The low frequency access antennas transmit a low frequency field about their respective sides of the vehicle as represented by field lines. A first respective set of field lines illustrated generally by 46 represent a field having a received signal strength indicator (RSSI) of a first signal strength (e.g., 0). RSSI is obtained by a receiving circuit of the broadcasting system that indicates a signal strength of a respective received message. That is, when the vehicle receiver receives a return signal, a receiving circuit measures the signal strength of the received signal. The RSSI is provided to the VCP for determining the signal strength of the received signal broadcasting the message. The RSSI is an indication of the power of the received signal. The strength of the RSSI signal is also an indication of a proximity of the portable device to the vehicle (i.e., the higher the RSSI value, the closer the portable device is to the vehicle). At design time of the system, varying degrees of signal strength may be determined which can then be correlated to the proximity of the portable device to the vehicle. A second respective set 47 represents a field having a received signal strength indicator (RSSI) of a second signal strength (e.g., 10). The portable device is determined to be closer to the vehicle in comparison to the portable device transmitting a signal at a location represented by the first respective set of field lines. A third respective set of field lines 48 represents a field having a third signal strength (e.g., 30). The assumption is made that the portable device is determined to be closer to the vehicle in comparison to the portable device transmitting a signal at a location represented by the second respective set of field lines. As a result, signal strengths relative to various distances are determined during design and development stages of the vehicle, various distances of portable device relative to the vehicle can be made in cooperation with the time-of-flight data as a function of the range measurement data to determine a range and position of the portable device relative to the vehicle.

In addition, a classification technique may be applied by the VCP to determine if the portable device is in the vehicle or outside the vehicle. Detection of the portable device within the vehicle may be made by a determination of whether the received signal is within close proximity to the vehicles window glass, inside or outside. The data and determined position are fused and incorporated with the vehicle PEPS module. Communication among the modules in the vehicle as well as the transceivers of the portable device are communicated over a same frequency band using a modulated carrier.

FIG. 5 illustrates an embodiment where the vehicle is mounted with at least three transceivers. As shown in FIG. 5, a first transceiver 50, a second transceiver 52, and a third transceiver 54 are mounted in the vehicle 12. Each of the transceivers is preferably located near the center of gravity of the vehicle (e.g., center of the vehicle). The relative locations of transceivers 50, 52, and 54 are known; however, each of the inter-transceivers ranges could be autonomously derived, and therefore, in such a case, knowing the fixed relative location would not necessarily be known a-priori. It should also be understood that more than three transceivers may be utilized. The transceivers 50, 52, and 54 are used to determine position and/or angle-of-arrival of the portable device using triangulation among the transceivers. As described earlier, three or more transceivers may be used to determine the angle-of-arrival and/or position of the portable device relative to the vehicle.

To determine the position and angle-of-arrival for the portable device, each of the ranges between all transceivers based on the vehicle and the portable device are determined at each measurement cycle. The ranges are calculated by multiplying a measured time-of-flight with the speed of light. All the ranges (i.e. of the onboard existing transceivers in between and the portable device) are used to calculate the portable device location (i.e., position) relative to the vehicle based on triangulation methods. In a similar way, the angle-of-arrival may be determined using array signal processing methods. Both localization and angle of arrival can use one of many existing measurement methods and calculation methods. The following list presents a list of existing range information measurements methods: Time of arrival (ToA), Time-difference-of-arrival (TDOA), Observed-time-difference-of-arrival (OTDOA), and accordingly location calculation methods as: Least squares (LS) and direct maximum likelihood (ML) exhaustive search. In addition to the time-of-flight measurements described herein, a hybrid approach combining RSSI measurements in between the multiple transceiver and the portable transceiver can be incorporated into the calculation resulting with a hybrid Time-of-Flight and RSSI location and angle of arrival estimation. In this embodiment of this invention, where location and/or angle of arrival are calculated for the portable device, the calculation of this additional information can be processed in the processor 18, or in the VCP as being host of the system or separated into parts where some parts of the calculation reside in the processor and the rest resides in the VCP.

The VCP manages the security operations (i.e., pairings) between the each vehicle transceiver and the portable device transceiver, the power aspects (e.g., measurement cycles), and range calculations. The information is fused and provided to the vehicle PEPS module for actuating the passive operations of the vehicle. Based on the determined angle-of-arrival of the portable device, a respective door of the vehicle may be selectively unlocked according to the approaching direction of the portable device.

It should be understood that the each of the approaches as described herein can be used in combination with the any state of art methods (e.g. RSSI) resulting in an hybrid method where ToF measurement are utilized. The combination can be utilized in the detection method where large distances from the vehicle are sensed using RSSI method and closer distances are measured utilizing the ToF method. In addition to detection mode, also the range estimation can utilize both measurement schemes and combine those into a single more robust and accurate range and position measurement.

While certain embodiments of the present invention have been described in detail, those familiar with the art to which this invention relates will recognize various alternative designs and embodiments for practicing the invention as defined by the following claims.

What is claimed is:

1. A passive entry-passive start portable device detection system comprising:
a portable device including a transceiver;
at least one vehicle-based transceiver broadcasting an interrogation signal, the transceiver of the portable device transmitting a response signal in response to the interrogation signal; and
a controller determining at least a range of the portable device relative to the at least one vehicle-based transceiver as a function of the time-of-flight of the interrogation and response signals, the controller controlling a measurement duty cycle of the interrogation signal as a function of the determined range.

2. The passive entry-passive start portable device detection of claim 1 system wherein the measurement duty cycle of the interrogation signal is dynamically modified as a function of the detected range of the portable device as determined by a position of the portable device relative to the at least one vehicle-based transceiver.

3. The passive entry-passive start portable device detection system of claim 2 wherein the measurement duty cycle is increased as the range between the portable device and the at least one vehicle-based transceiver decreases, wherein power for operating the at least one vehicle-based transceiver increases as the measurement duty cycle increases, and wherein power for operating the at least one vehicle-based transceiver decreases as the measurement duty cycle decreases.

4. The passive entry-passive start portable device detection system of claim 3 wherein a plurality of range regions representing distances from the at least one vehicle-based transceiver are predetermined, wherein the determination of the portable device within one of the predetermined range regions identifies distance of the portable device relative to the at least one vehicle-based transceiver.

5. The a passive entry-passive start portable device detection system of claim 4 wherein the measurement duty cycle for interrogating the portable device is increased to track the portable device as the range between the portable device and the at least one vehicle-based transceiver decreases.

6. The passive entry-passive start portable device detection system of claim 5 wherein the measurement duty cycle is determined as a function of a speed of approach of the portable device.

7. The passive entry-passive start portable device detection system of claim 2 wherein the measurement duty cycle of the interrogation signal is dynamically modified as a function of the detected range of the portable device as determined by a time-of-flight of a preceding response signal.

8. The passive entry-passive start portable device detection system of claim 7 wherein the time-of-flight includes time-of-arrival technique.

9. The passive entry-passive start portable device detection system of claim 7 wherein the time-of-flight includes an observed time-difference-of-arrival technique.

10. The passive entry-passive start portable device detection system of claim 2 wherein the range of the portable device is determined by the controller as a function of a received signal strength of the reply signal as transmitted by the portable device transceiver.

11. The passive entry-passive start portable device detection system of claim 2 wherein the range of the portable device is determined by the controller utilizing a hybrid technique that includes a combined received signal strength technique and a time-of-flight technique.

12. The passive entry-passive start portable device detection system of claim 2 wherein the controller determines an approach of the portable device utilizing a triangulation technique.

13. The passive entry-passive start portable device detection system of claim 2 wherein the controller determines whether the portable device is inside or outside of the vehicle.

14. The passive entry-passive start portable device detection system of claim 2 further comprising a passive-entry-passive start module, wherein the controller provides position data to the passive entry-passive start module for enabling vehicle operations passively.

15. The passive entry-passive start portable device detection system of claim 14 wherein based on an identification of the portable device vehicle use behaviors associated vehicle the portable device identification is used to enable passive vehicle operations via the passive entry-passive start module.

16. The passive entry-passive start portable device detection system of claim 1 wherein the at least one vehicle-based transceiver includes a first transceiver, a second transceiver, and a third transceiver, wherein a triangulation technique is applied by the controller utilizing the received signals from the first, second, and third transceivers.

17. The passive entry-passive start portable device detection system of claim 16 wherein the controller determines a position of the vehicle utilizing the triangulation technique.

18. The passive entry-passive start portable device detection system of claim 17 wherein each of the inter-transceivers ranges is autonomously derived by a self-calibrating technique.

19. The passive entry-passive start portable device detection system of claim 1 wherein the transceiver of the portable device determines an access delay, the access delay being a time interval between when a broadcast signal is received the transceiver of the portable device to a time when the transceiver of the portable device transmits a response signal, wherein the transceiver of the portable device transmits the access delay information in the response signal, and wherein the controller factors out the access time for determining the time-of-flight.

20. The passive entry-passive start portable device detection system of claim 1 wherein an access delay is predetermined, the access delay being a time interval between when a broadcast signal is received by the transceiver of the portable device to a time when the transceiver of the portable device transmits a response signal, wherein transceiver of the portable device transmits the access delay information in the response signal, and wherein the controller factors out the access time for determining the time-of-flight.

21. A method for enabling passive entry-passive start operations of a vehicle the method comprising:
    transmitting an interrogation signal via a vehicle-based transceiver;
    transmitting a response signal via a portable device-based transceiver in response to the interrogation signal;
    determining a range of the portable device, via a controller, to the vehicle-based transceiver as a function of a time-of-flight of the interrogation and response signals; and
    controlling a measurement duty cycle of the interrogation signal via the controller as a function of the determined range of the portable device to the vehicle-based transceiver.

* * * * *